July 2, 1940. K. R. SCHNEIDER 2,206,646
CLUTCH MECHANISM
Original Filed Dec. 2, 1936
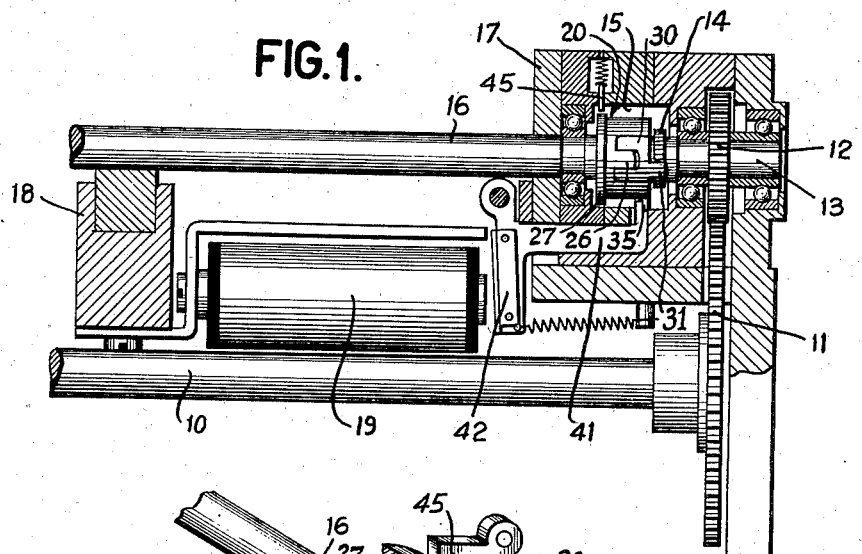
FIG. 1.
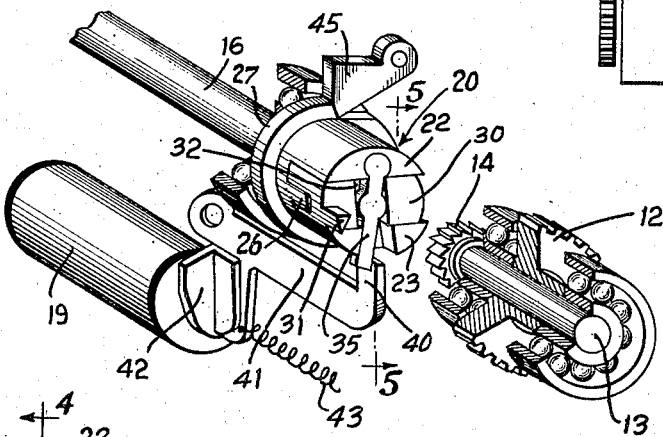
FIG. 2.
FIG. 5.
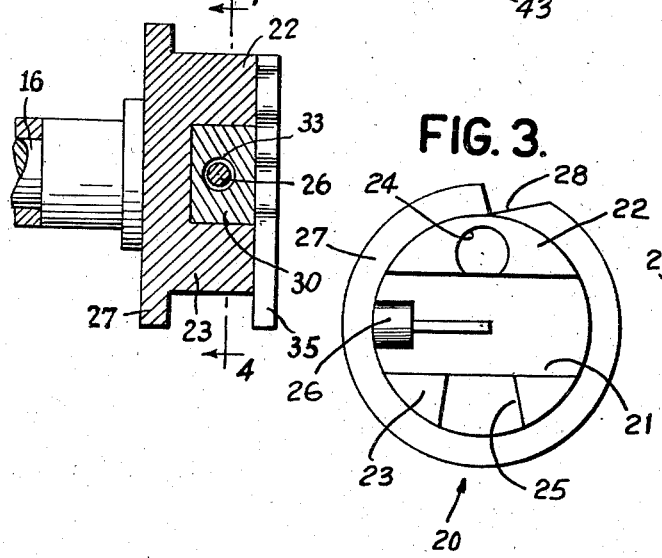
FIG. 3.
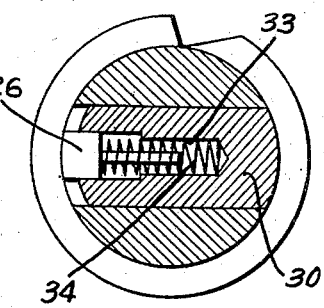
FIG. 4.
INVENTOR
Kurt R. Schneider
BY
ATTORNEY Patented July 2, 1940

2,206,646

UNITED STATES PATENT OFFICE 2,206,646

CLUTCH MECHANISM

Kurt E. Schneider, Endicott, N. Y., assignor to International Business Machines Corporation, New York, N. Y., a corporation of New York Original application December 2, 1936, Serial No. 113,799. Divided and this application October 30, 1937, Serial No. 171,925

4 Claims. (Cl. 192—28)

This invention relates to clutch mechanisms and more particularly to clutch mechanisms controlled by electromagnetic control means.

An object of the present invention is to provide a more simplified clutch mechanism reduced to a minimum of elements which is extremely positive in its clutching action.

Another object is to provide a clutch mechanism the operation of which is controlled by a single electromagnetic device. The operation of the electromagnetic device controls the period of time the clutch mechanism remains operated; that is, upon energization and immediate de-energization of the device the clutch operation is equivalent to a one-revolution clutch, but if the electromagnetic device remains energized for a greater interval of time, the clutch mechanism remains operated to drive the driven member a number of revolutions depending entirely upon the length of time the electromagnetic device remains energized.

Further objects of the instant invention reside in any novel feature of construction or operation or novel combination of parts present in the embodiment of the invention described and shown in the accompanying drawing whether within or without the scope of the appended claims and irrespective of other specific statements as to the scope of the invention contained herein.

In the drawing:

Fig. 1 is a partial sectional view of the clutch mechanism.

Fig. 2 is an exploded view of the clutch mechanism.

Fig. 3 is a detailed view of the annular block or member of the clutch mechanism.

Fig. 4 is a detailed sectional view taken along the lines 4—4 of Fig. 5 showing the assembly in part of the annular member and slidable toothed dog member.

Fig. 5 is a detailed sectional view taken along the lines 5—5 of Fig. 2 showing the assembly of the slidable dog member and the dog control lever.

Referring now to Fig. 1, the driving member or mechanism is shown to comprise the shaft 10 and associated gearing 11 which is suitably mounted so as to be driven by any suitable means, the gearing 11 in turn cooperating with the gear 12 secured to shaft 13 which also is suitably mounted. Secured to the shaft 13 is a ratchet wheel 14. The driven member is shown to comprise a clutch mechanism indicated generally by the reference character 15 and a shaft 16 which is associated with the clutch mechanism and which is suitably mounted; in the present example shown to be supported by the frame 17 and support member 18. Suitably disposed is shown an electromagnetic device 19 in the form of a magnet which is adapted to cooperate with the clutch mechanism in a manner to be described later herein.

The clutch mechanism in detail will now be described and, referring to Figs. 2–5, is shown to comprise an annular member or block, which is secured to shaft 16, shown in detail in Fig. 3 and indicated generally by the reference character 20. The annular member is provided with a channel 21 so formed as to divide the member into two sections 22 and 23. Recesses, generally indicated by the reference characters 24 and 25, are formed in the said sections of the annular member. A spring supporting post 26 is also disposed in the channel way formed in the annular member. The said spring post 26 may be formed as an integral part of the said annular member. A shoulder or flange 27 is also shown to be associated with the annular member which may be integral therewith or a separate member secured thereto. A single notch 28 is shown to be formed in this flange, the purposes of which will be understood as the description progresses. Disposed in the said channel formed in the annular member is a slidable dog member or means 30 which is provided with a single tooth 31 and a suitable recess 32. This recess is formed along the minor axis of the slidable member. This slidable member is also provided with a recess 33 disposed along the longitudinal or major axis of the member which is so formed or shaped as to fit over the spring post member 26 disposed in the channel 21. A spring 34 is adapted to be supported by the spring post 26 and arranged to fit within the said recess 33 in the slidable member. Therefore it will be seen that the slidable member, when disposed in the channel 21, is normally urged by the spring 34 to the right as viewed in Fig. 2. A dog lift lever 35 is disposed in the recesses 24 and 25 formed in the annular member and also in the recess 32 formed in the slidable member or dog 30. It is to be noted that one end of the said dog lift lever is circular in shape so as to conform to the shape of the recess 24 and due to the width of the recess 25 formed in the annular member the dog lift lever can be positioned or pivoted about its one end, namely, that end disposed in the recess 24 which actually acts as a pivot for the dog lift lever. By virtue of positioning or pivoting the dog lift lever 35, the slidable member or dog 30 is in turn selectively positioned by the dog lift lever. When the dog lift lever 35 is positioned to its extreme left hand position, as viewed in Fig. 2, the slidable member is urged against the action of spring 34. When the dog lift lever is released, one manner of which will be shown hereinafter, the spring 34 urges the slidable member to the right, as viewed in said figure. The ratchet wheel 14 comprising in part the driving member is disposed, as shown in Fig. 1, so as to be adapted to be engaged by the single tooth 31 on the dog 30 whenever the said dog is released or in its right hand position, as viewed in Fig. 2. In this manner the engagement of the ratchet wheel and tooth of the clutch mechanism is effected so as to operate the driving member and driven member in unison.

It is shown in Fig. 2 that the dog lift lever 35 is of such length as to extend beyond the annular member 20. Normally disposed in the path of the dog lift lever is a stop 40 which is shown to be part of an extension arm or member 41 which in turn is secured to the armature 42 of the magnet 19. The spring 43 normally maintains the armature and associated extension arm and stop in position so as to be in the path of the dog lift lever and act as a stop, thereby positioning the dog lift lever to its extreme left position, as viewed in Fig. 2, and in turn urging the dog 30 against the spring 34 (see Fig. 4), thereby maintaining the tooth 31 of the dog disengaged from the continuously rotating ratchet wheel 14. However, upon energization of the magnet 19 the armature 42 is attracted by the magnet to position the stop 40 out of the path of the dog lift lever 35, thus releasing the slidable dog member 30 which then is urged by the spring 34 to the right, as viewed in Fig. 2, to engage immediately the ratchet wheel 14, thus establishing a connection between the driving and driven members so as to operate these members in unison. It is seen that if the magnet is immediately energized and deenergized, immediately upon release of the dog lift lever and the associated dog 30, the stop 40 is positioned by spring 43 in the path of the dog lift lever so that immediately upon completion of one revolution of the clutch mechanism the tooth 31 is disengaged from the ratchet wheel 14, thus preventing further rotation of the driven member. However, if the magnet 19 remains energized for a long period of time, it is seen that the slidable dog member 30 remains in engagement with the ratchet wheel 14 as long as the stop 40 is maintained out of the path of the dog lift lever. Assuming that the direction of rotation of shaft 13 is in a counterclockwise direction, in order to maintain the driven clutch mechanism and shaft 16 positively locked against rotation in one direction whenever the slidable dog member 30 is maintained out of engagement with the ratchet wheel 14, a pivoted spring-pressed stop pawl member 45 is provided to engage the notch 28 in the flange 27 of the annular member so as to prevent any back-lash of the clutching mechanism and thus provide a positive means for locking the clutch mechanism in an inoperative position.

While many applications of the clutch mechanism just described will be obvious to those skilled in the art, however, one form of application is illustrated in the copending application, Serial No. 113,799, filed December 2, 1936. In this said copending application the present clutch mechanism is described in detail, however, not claimed therein, and the present application represents a divisional application thereof.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. In a device of the character described, a driving member, a driven member, clutch means to operate the members in unison comprising an annular member having a channel formed therein so as to form two sections thereof, a slidable member disposed in the said channel, recesses formed in the two sections of the annular member and said slidable member, and means disposed in the said recesses to control the positioning of the slidable member, the recess formed in one of said sections shaped so as to act as a pivot for the last named means.

2. A device of the character described comprising a driving member having driving means coupled thereto, a driven member, means for effecting operation of the said members in unison comprising an annular member provided with a channel extending across the entire member to divide the annular member in two sections, a slidable member disposed in the said channel adapted to be positioned into and out of engagement with the said driving means, and positionable means pivoted on one section of the annular member for controlling the positioning of the slidable member thereby controlling the operation of the driving and driven members.

3. A device of the character described comprising a driving member having driving means coupled thereto, a driven member, means for effecting operation of the said members in unison comprising an annular member provided with a channel extending across the entire annular member to divide it into two sections, a slidable member disposed in the channel adapted to be positioned into and out of engagement with the said driving means, positionable means pivoted on one section of the annular member for controlling the positioning of the slidable member, said pivoted means extended beyond the annular member, and means for engaging the extended portion of the pivoted means for controlling the operation of the driving and driven members.

4. A device of the character described comprising a driving member having driving means coupled thereto, a driven member, means for effecting operation of the said members in unison comprising an annular member provided with a channel extending across the entire section of the annular member to divide it into two sections, a slidable member disposed in the channel adapted to be positioned into and out of engagement with the said driving means, positionable means pivoted on one of the sections of the annular member for controlling the positioning of the slidable member, said pivoted means having an extended portion beyond the annular member, and electromagnetically controlled means positionable into and out of the path of the said extended portion of the pivoted means for controlling the operation of the driving and driven members.

KURT R. SCHNEIDER.